T. I. WESTON.
PIPE JOINT.
APPLICATION FILED SEPT. 28, 1914.

1,132,137.

Patented Mar. 16, 1915.

Witnesses

T. I. Weston,
Inventor by
Attorneys

UNITED STATES PATENT OFFICE.

THOMAS I. WESTON, OF COLUMBIA, SOUTH CAROLINA.

PIPE-JOINT.

1,132,137.

Specification of Letters Patent.  Patented Mar. 16, 1915.

Application filed September 28, 1914. Serial No. 863,934.

*To all whom it may concern:*

Be it known that I, THOMAS I. WESTON, a citizen of the United States, residing at Columbia, in the county of Richland and State of South Carolina, have invented a new and useful Pipe-Joint, of which the following is a specification.

The present invention appertains to pipe joints, and aims to provide a novel and improved joint for concrete and various other pipes, conduits and the like.

This invention contemplates the provision of a pipe or conduit joint, embodying male and female or spigot and socket portions upon the ends of the pipe or conduit sections, which are adapted to coöperate in a novel manner, whereby the pipe sections may be readily and properly assembled, and may then be securely locked together.

It is also within the scope of the invention, to provide a pipe joint of simple formation, which may be inexpensively molded or otherwise manufactured, and which will be convenient, practical and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in its preferred embodiment in the accompanying drawing, wherein:—

Figure 1:
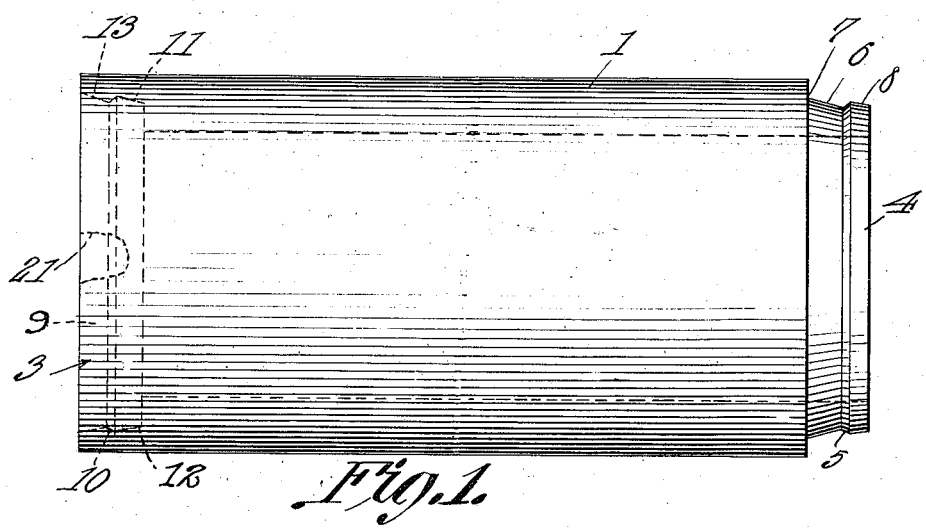
Figure 2:
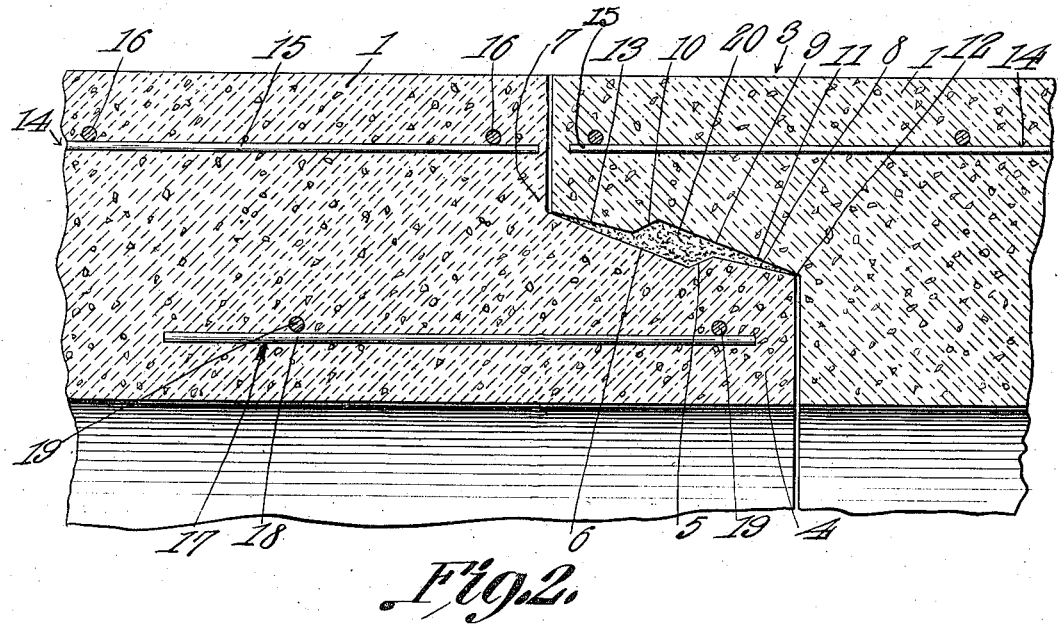

Figure 1 is an elevation of a pipe or conduit section formed with the improved male and female or spigot and socket ends. Fig. 2 is an enlarged sectional detail taken through the joint between two pipe or conduit sections.

In carrying out the invention, each of the pipe or conduit sections 1 is provided at one end with a male or spigot joint member 4, and at its other or opposite end with a female or socket portion 3, whereby when the pipe sections are laid together properly, the spigot and socket portions will mate or complement each other, the socket portions 3 receiving the spigots 2 as suggested in Fig. 2.

The spigot 4 has its circumference or periphery tapered from the corresponding end of the pipe section 1, while the interior of the spigot 2 is flush with the interior of the body of the pipe section, the spigot being in form of an annular outstanding flange projecting from the end of the pipe section immediately around the passage or bore thereof. The circumference or periphery of the spigot 4 is formed with an oppositely tapered portion or beveled shoulder 5 facing the corresponding end of the pipe section. The beveled shoulder 5 is disposed adjacent the free edge of the spigot 4 and the tapered portion 6 between the shoulder 5 and the end of the pipe section 1, has its basal portion 7 of a greater diameter than the annular ridge formed by the shoulder 5. The tapered portion 8 of the spigot between the shoulder 5 and the free edge of the spigot, is tapered to a less degree than the tapered portion 6.

The female or socket portion 3 of each pipe section 1 embodies the socket or annular rabbet 9 surrounding the passage or bore of the pipe section at the corresponding end thereof, and which is tapered inwardly from the end of the pipe section. The side walls of the socket or rabbet 9 are provided with an annular oppositely tapered portion or beveled shoulder 10 facing inwardly and arranged adjacent the mouth of the socket, there being a tapered portion 11 between the shoulder 10 and the bottom 12 of the rabbet 9 which is of a smaller diameter adjacent the bottom 12 than is the ridge formed by the shoulder 10. The tapered portion 13 of the socket 9 between the shoulder 10 and the corresponding end of the pipe section 1, is tapered to a less degree than the tapered portion 11, whereby the formation of the female or socket portion 3 is precisely the reverse of the formation of the male or spigot portion 4.

The ridge formed by the shoulder 5 of the spigot is of slightly smaller diameter than the ridge formed by the shoulder 10 of the socket portion 3, and the outer diameter of the free portion of the spigot is practically the same as the diameter of the bottom portion of the socket 9, while the diameter of the mouth portion of the socket 9 is practically the same as the basal portion 7 of the spigot 4. When the pipe sections are assembled, as suggested in Fig. 2, the shoulders 5 and 10 of the spigot and the socket portions will be substantially parallel, as well as the respective tapered portions 6 and 11, and 8 and 13, the spigot being of a size to fit snugly within the socket or recess 9.

As illustrated, the pipe sections are molded or formed from concrete, although it is to be understood that this invention may be employed with pipes or conduits constructed of various materials, and in various sizes. If the pipe sections are constructed of concrete, it is preferable to reinforce the same. Thus, an annular reinforcing 14 may be embedded within each pipe section adjacent the periphery thereof, the reinforcing 14 embodying the longitudinal wires or rods 15, and the annular wires or rods 16 coöperating therewith. The reinforcing 14 preferably projects to that end of the pipe section having the female or socket portion 3, so as to reinforce the annular flange or lip formed by the socket 9. In order to reinforce the spigot 4, an annular reinforcing 17 is embedded within the spigot 4 and the corresponding end portion of the body portion of the pipe section. The reinforcing 17 embodies the short longitudinal wires or rods 18, and the rings or annular wires or rods 19 coöperating with the rods 18.

The pipe sections may be laid in two different manners, viz., either by a wiped joint, or by a poured joint, each of which will be presently described. In laying the pipe sections, using the wiped joint, the exterior and interior of the spigot and socket portions 4 and 3, respectively, are wiped with mortar to the proper thickness, so as to cover or coat the same properly. Then, after the pipe sections have been properly laid and alined, they are moved longitudinally together, to cause the mating spigot and socket portions 4 and 3, respectively, to interlock. Due to the tapered formations of the spigot and socket portions, they may be readily slipped longitudinally into proper position, and when the pipe sections are slid "home" relative to one another, the mortar which was previously wiped upon the joint portions will be brought together and compressed tightly between the same so as to fill up the crevices, as designated at 20 in Fig. 2. After the mortar 20 has solidified or hardened, the same will form an annular key between the opposed shoulders 5 and 10 of the spigot and socket portions of the joint, to securely lock the pipe sections against separation, and to firmly hold them in alinement. The tapered formations of the spigot and socket portions not only enables them to be readily assembled, but it is to be noted that they will also be strengthened, to avoid possible breakage, and furthermore, when the sections are forced home, the complementing tapered portions 8—11 and 6—13 of the joint portions will fit or contact with each other to center the pipe sections relative to one another, and to hold them concentric or coaxial with their passages or bores flush. This is an important feature.

When the poured joint is used, the pipe sections are first brought longitudinally together, so that the spigot 4 enters the socket 9, which will cause the pipe sections to aline and remain concentric or coaxial, as above explained. A portion of the socket portion 3 may then be broken away, as indicated by the dotted line 21 in Fig. 1, to provide an opening through which the mortar or plastic material may be poured into the annular space between the spigot and socket portions, to thereby form the key 20 after the mortar has hardened. The mortar will also fill up the portion which is broken away, as at 21 in Fig. 1.

When the pipe sections are assembled, it will be noted that the tapered portions 13, 11, 8 and 6 are tapered in the same direction, while the shoulders 10 and 5 are tapered in the opposite direction and face each other in order that the mortar will lodge properly between the shoulders and tapered portions. Particular attention is also directed to the fact that the tapered portions 11 and 6 are arranged at a greater angle relative to the axis of the pipe sections than the tapered portions 13 and 8, whereby the tapered portions 11 and 6 contact at opposite sides of the shoulders to center the pipe sections relative to one another and to close the space between the shoulders and tapered portions, and furthermore, the angles between the shoulder 10 and tapered portions 13 and 11 and between the shoulder 5 and tapered portions 8 and 6 are obtuse angles, whereby the liability of the parts chipping or breaking off will be reduced to a minimum, and furthermore, the pipe sections may be readily separated prior to the introduction of the mortar, without the liability of the shoulders catching each other and impeding the withdrawal of the spigot from the socket.

From the foregoing, taken in connection with the drawing, the advantages and capabilities of the invention will be obvious to those versed in the art, it is thought, without further comment being necessary. It will be apparent that the spigot and socket portions may be constructed in various proportions and sizes, according to the character of pipe or conduit sections upon which they are utilized, and according to the various other circumstances.

It will of course be understood that my invention consisting in the novel construction of joint disclosed is not confined in its use to the particular form shown. The term spigot has been used in describing the inner tapering member of the joint but it is to be understood that the term is used merely for convenience of description and not as a limitation defining the form of the inner member.

Having thus described the invention, what is claimed as new is:—

1. A joint of the type described comprising two members one having a tapered socket and the other having a tapered spigot, the socket and spigot being so shaped that when the spigot is inserted in the socket its outer surface will make contact therewith at its free end portion and at its basal portion, an intermediate portion of the socket and spigot between the ends thereof being separated from each other by depressions so shaped as to leave a shoulder in the socket on the side of the depression next to the tapered end and to leave a shoulder on the spigot on the side of the depression next to the free end, and a filling material in said depressions forming with said shoulders a key to hold the parts together.

2. A joint of the type described comprising two members one having a tapered socket and the other having a tapered spigot, the socket and spigot being so shaped that when the spigot is inserted in the socket its outer surface will make contact therewith at its free end portion and at its basal portion, an intermediate portion of the socket and spigot between the ends thereof being separated from each other by depressions so shaped that the surfaces of the socket and spigot gradually approach each other at their ends and to leave a shoulder in the socket on the side of the depression next to the tapered end and to leave a shoulder on the spigot on the side of the depression next to the free end, and a filling material in said depression forming with said shoulders a key to hold the parts together.

3. A joint of the type described comprising a pair of tubular members, one having a tapered socket and the other having a tapered spigot, the socket and spigot being so shaped that when the spigot is inserted in the socket its outer surface will make contact therewith at its free end portion to center the parts, an intermediate portion of the socket and spigot between the ends thereof being separated from each other by depressions so shaped as to leave a shoulder in the socket on the side of the depression next to the tapered end and to leave a shoulder on the spigot on the side of the depression next to the free end, and a filling material in said depressions forming with said shoulders a key to hold the parts together.

In testimony that I claim the foregoing as my own, I have hereto affixed my signature in the presence of two witnesses.

THOMAS I. WESTON.

Witnesses:
O. G. SMITH,
F. T. BULL.